(12) United States Patent
Poulis et al.

(10) Patent No.: US 6,859,051 B1
(45) Date of Patent: Feb. 22, 2005

(54) SYSTEMS AND METHODS FOR IMPEDANCE SYNTHESIS

(75) Inventors: Spiro Poulis, West Jordan, UT (US); John Evans, Riverton, UT (US); Shayne Messerly, Farmington, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 10/452,373

(22) Filed: Jun. 2, 2003

Related U.S. Application Data

(62) Division of application No. 09/649,188, filed on Aug. 28, 2000, now Pat. No. 6,573,729.

(51) Int. Cl.[7] .......................... G01R 27/08; H03L 5/00; H04M 1/24
(52) U.S. Cl. ...................... 324/713; 324/691; 327/308; 379/24; 379/30
(58) Field of Search .................. 307/31, 32, 34; 324/691, 713, 600, 712, 523, 525; 702/57–61, 64–65; 379/24, 30; 327/308; 326/30; 375/257

(56) References Cited

U.S. PATENT DOCUMENTS

| | | | |
|---|---|---|---|
| 2,978,542 A | 4/1961 | Huxtable | 178/45 |
| 4,017,750 A | 4/1977 | Voorman | 327/565 |
| 4,061,883 A | 12/1977 | Chambers, Jr. | 379/343 |
| 4,161,633 A | 7/1979 | Treiber | 379/254 |
| 4,317,963 A | 3/1982 | Chea, Jr. | 379/377 |
| 4,351,060 A | 9/1982 | Treiber | 375/230 |
| 4,387,273 A | 6/1983 | Chea, Jr. | 379/398 |
| 4,395,590 A | 7/1983 | Pierce et al. | 379/93.36 |
| 4,442,416 A | 4/1984 | Epsom et al. | 333/263 |
| 4,894,864 A | 1/1990 | Cook | 379/398 |
| 5,001,770 A * | 3/1991 | Losic et al. | 388/811 |
| 5,181,240 A | 1/1993 | Sakuragi et al. | 379/93.36 |
| 5,249,225 A | 9/1993 | Williams | 379/404 |
| 5,282,157 A | 1/1994 | Murphy et al. | 703/4 |
| 5,289,538 A | 2/1994 | Lauer et al. | 379/402 |
| 5,500,879 A | 3/1996 | Webster et al. | 375/353 |
| 5,515,434 A | 5/1996 | Cotreau | 379/404 |
| 5,528,131 A | 6/1996 | Marty et al. | 323/238 |
| 5,790,656 A | 8/1998 | Rahamim et al. | 379/399.01 |
| 5,809,068 A | 9/1998 | Johnson | 375/222 |
| 5,815,567 A | 9/1998 | David et al. | 379/377 |

* cited by examiner

*Primary Examiner*—Vincent Q. Nguyen
(74) *Attorney, Agent, or Firm*—Workman Nydegger

(57) ABSTRACT

The present invention synthesizes a prescribed impedance. The impedance is synthesized by generating a current having a value substantially equal to a voltage divided by a prescribed impedance. Sensing the line voltage and converting that sensed line voltage to its digital equivalent accomplish this first step. The digital line voltage is processed by a factor related to the prescribed impedance to produce an output voltage that has a value substantially equal to the sensed voltage divided by the prescribed impedance. The output voltage controls a voltage to current converter that generates the appropriate current across the points or terminals where the line voltage was measured. Thus, the prescribed impedance is generated across these points or terminals because the line voltage divided by the generated current is substantially equal to the prescribed impedance.

10 Claims, 2 Drawing Sheets

SYSTEMS AND METHODS FOR IMPEDANCE SYNTHESIS

CROSS-REFERENCE TO RELATED APPLICATIONS

This application is a divisional of U.S. patent application Ser. No. 09/649,188, filed Aug. 28, 2000, and entitled SYSTEMS AND METHODS FOR IMPEDANCE SYNTHESIS now U.S. Pat. No. 6,573,729, which is incorporated herein by reference in its entirety.

BACKGROUND OF THE INVENTION

1. The Field of the Invention

The present invention relates to impedance synthesis. More specifically, the present invention relates to the synthesis of user specified source or load impedances using digital processing.

2. The Relevant Technology

Ordinarily, circuits are designed such that the load impedance is much greater than the impedance of the source that is driving the load. Otherwise, the load impedance may have an adverse effect on the source voltage by causing the output voltage of the source to drop. This undesirable result is related to the finite value of the source impedance. Transmission times, however, are an exception to this general rule. In the case of transmission lines, it is desirable that the load impedance match the impedance of the transmission line for several reasons.

In a basic form, a transmission line is two or more parallel conductors which connect a source to a load. The load presents an impedance to the transmission line and the transmission line presents a characteristic impedance, which is usually a combination of the source impedance and the impedance of the transmission line, to the load. When the transmission line is attached to a load having an impedance equal to the characteristic impedance of the transmission line, the power in the signal transferred to the load is maximized and the signal is not reflected back to the source. These benefits are important for many different applications. If the power transfer is not maximized, it is possible that the connecting device will be unable to properly interpret the signal. If signal reflections are present on the transmission line, then the signal becomes difficult to demodulate and additional circuitry is required to remove the reflections or echoes.

One common example of a transmission line which is used for moderate frequencies is a parallel conductor, which is frequently used in telephone networks. The parallel conductors of a telephone network are often referred to as the tip and ring. Thus, the tip and ring comprise the transmission line and the load impedance may be embodied as a telephone, modem or other device capable of connecting to the telephone network.

The telephone network specifies the characteristic impedance of the transmission line which must be matched by a connecting device in order to fully transfer power and avoid signal reflection. However, the impedance specified by the telephone network is usually only an approximation of the actual impedance, which results from such variables as: the variations in the length of the transmission lines to the connecting device from the central office; various wiring topologies within an intermediary installation such as a series of parallel transmission lines within a business or other structure; and intrinsic variations in the transmission lines themselves. The actual characteristic impedance presented by the telephone network is difficult to precisely match and is usually only approximated.

With regard to telephone networks, the problem is complicated by the fact that telephone networks across the world specify different characteristic impedances. In this situation, it is feasible that a device functioning perfectly in one telephone network will encounter difficulty in another telephone network. Because telephones, modems and other telephonic devices are being used world wide, it is necessary to enable a telephonic device to function in any telephone network environment.

While many devices are capable of operating in different networks, the result is not always satisfactory. One solution is to characterize the impedances of the various telephone networks into groups and physically place more than one impedance in the device. The appropriate impedance is then selected using appropriate switching technologies such as relays or field effect transistor (FET) switches. This method has several disadvantages. First, control circuitry must be employed to control the relays and switches, which is not a trivial task because of the high voltages which may be present on many transmission lines. Because of the high voltages, the components used for the switches and relays can be large and expensive and must be rated to withstand the high voltages which can be present on a transmission line.

While placing multiple impedances on a device to permit a device to function in more network, the physical impedances physically placed on the device are designed to approximate, rather than match, the characteristic impedances that may be encountered in different telephone networks, which results in less than optimal power being transferred to the load as well as signal reflections back to the signal source. Also, many devices, such as modems, have limited printed circuit board surface area on which to place these additional circuit elements and a relatively large number of discrete circuit components such as resistors, operational amplifiers and capacitors can require significant surface area. Further, the combined tolerances of the passive and active circuit components may result in a large variance from the desired impedance.

The problem of properly terminating a transmission line has also been addressed in terms of impedance synthesis. However, these attempts have involved the use of discrete circuit components such as resistors and operational amplifiers. These methods, however, are limited to synthesizing real or resistive impedances. Recursive digital filters have also been utilized, but this approach introduces incidental shunting impedances, whose effects must be eliminated. In addition, digital filters are capable of introducing unacceptable delays.

BRIEF SUMMARY OF THE INVENTION

While many devices are capable of operating in different networks, the result is not always satisfactory. One solution is to characterize the impedances of the various telephone networks into groups and physically place more than one impedance in the device. The appropriate impedance is then selected using appropriate switching technologies such as relays or field effect transistor (FET) switches. This method has several disadvantages. First, control circuitry must be employed to control the relays and switches, which is not a trivial task because of the high voltages which may be present on many transmission lines. Because of the high voltages, the components used for the switches and relays can be large and expensive and must be rated to withstand the high voltages which can be present on a transmission line.

While placing multiple impedances on a device to permit a device to function in more network, the physical impedances physically placed on the device are designed to approximate, rather than match, the characteristic impedances that may be encountered in different telephone networks, which results in less than optimal power being transferred to the load as well as signal reflections back to the signal source. Also, many devices, such as modems, have limited printed circuit board surface area on which to place these additional circuit elements and a relatively large number of discrete circuit components such as resistors, operational amplifiers and capacitors can require significant surface area. Further, the combined tolerances of the passive and active circuit components may result in a large variance from the desired impedance.

The problem of properly terminating a transmission line has also been addressed in terms of impedance synthesis. However, these attempts have involved the use of discrete circuit components such as resistors and operational amplifiers. These methods, however, are limited to synthesizing real or resistive impedances. Recursive digital filters have also been utilized, but this approach introduces incidental shunting impedances, whose effects must be eliminated. In addition, digital filters are capable of introducing unacceptable delays.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
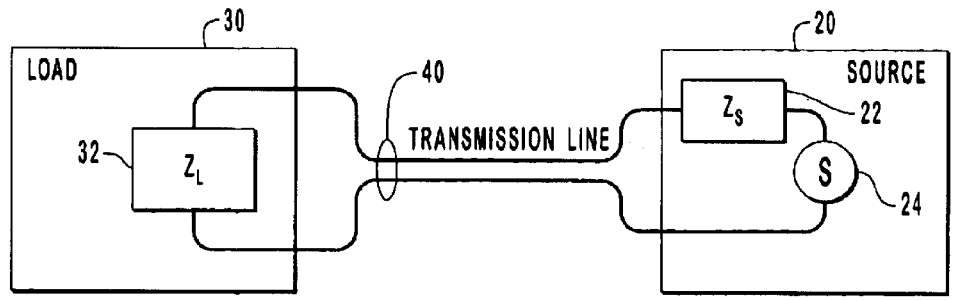
FIG. 1 is a block diagram illustrating a source impedance connected to a load impedance by a transmission line.

Impedances are a fundamental part of electronics. The analysis and design of circuits requires knowledge of impedance and its effects. For example, telephone networks have an associated characteristic impedance and any device that connects to that telephone network must be designed to match the prescribed impedance at particular frequencies. These requirements are imposed in part to protect the telephone network from the potentially adverse effects of a poorly designed connecting device. More importantly, these requirements ensure that a connecting device is able to maximize power transfer and avoid signal reflection.

Typically, impedance is created by some combination of resistors, capacitors, and inductors. However, these elements have inherent tolerance levels that can affect the actual value of the impedance being designed. Additionally, these circuit elements are relatively large and occupy precious surface area on such devices as modem and network interface cards that could be used for other purposes. These and other limitations are overcome by the present invention which provides for the synthesis of an impedance which essentially eliminates the need for physical circuit elements in some circumstances. The present invention is capable of synthesizing both load and source impedances and can be adapted to synthesize an impedance wherever an impedance is needed.

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for digitally synthesizing an impedance. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The present invention is described with reference to a transmission line because a transmission line typically connects a load impedance with a source impedance. It is understood, however, that the systems and methods of the present invention are not limited to applications requiring transmission lines. FIG. 1 generally illustrates the impedances associates with a transmission line. Source 20 typically generates a signal which is transmitted to load 30. Source 20 also receives signals generated and transmitted by load 30. Source 20 is represented as having a signal generator 24 and a source impedance 22. Load 30 illustrates a load impedance 32. Load 30 is connected to source 20 by transmission line 40 and as previously indicated, signal reflection and power transfer are two concerns associated with transmission lines. These and other problems may be avoided by having load impedance 32 substantially match source impedance 22. From the point of view of load 30, source impedance 22 includes the inherent impedance of transmission line 40.

Figure 2:
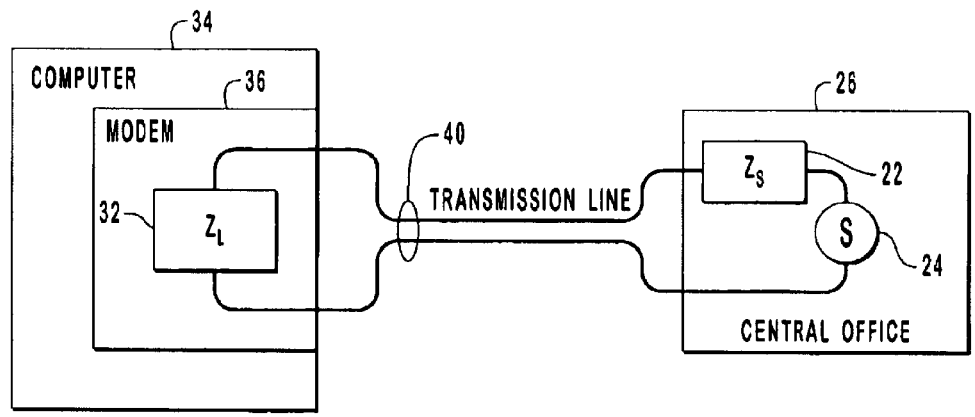
FIG. 2 is a block diagram depicting a modem connected to a telephone network in terms of a load impedance and a source impedance.

FIG. 2 is a practical implementation of the generalized case illustrated in FIG. 1. Modem 36 is an example of a connecting device, which is capable of connecting with central office 26. Central office 26 is part of a telephone network, which specifies the impedances that must be met by connecting devices in certain states. For example, the impedance needed to terminate a ringing signal, which has a relatively low frequency, produced by central office 26 is often different than the impedance required to properly terminate signals such as voice signals, which have higher frequencies. In this example, central office 26 is equivalent to source 20 of FIG. 1. Modem 36 is representative of load 30 and is designed to present a prescribed load impedance 32 to central office 26.

Figure 3:
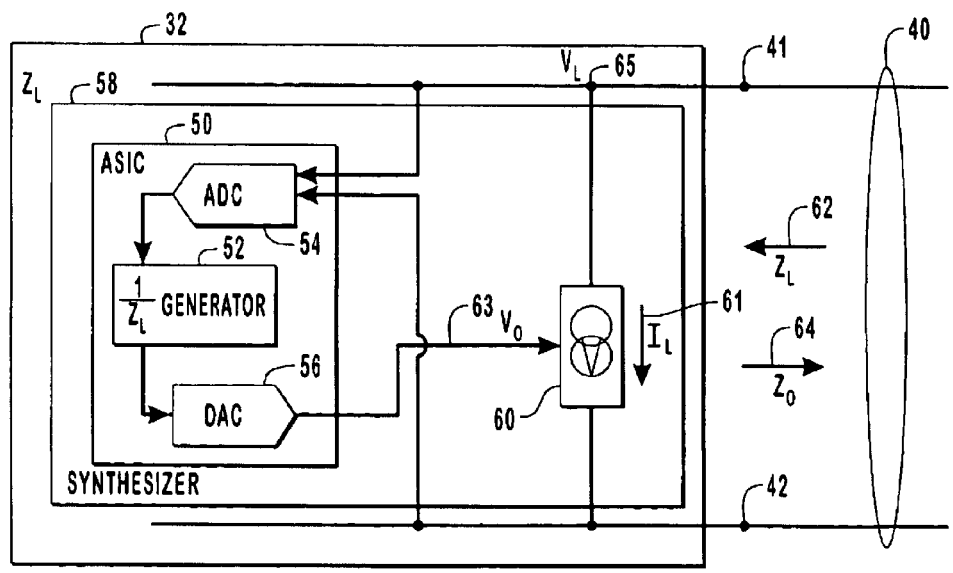
FIG. 3 is a schematic diagram illustrating the synthesis of a load impedance.

FIG. 3 is an exemplary schematic of one embodiment for synthesizing a load impedance. Load impedance 32 is effectively connected to transmission line 40 via terminals 41 and 42. Load impedance 32, looking towards transmission line 40 sees characteristic impedance 64. Transmission line 40 looking towards terminals 41 and 42 sees apparent load impedance 62. Apparent load impedance 62 is composed of two impedance components, the actual load impedance of the attached load and the synthesized load impedance. When combined the actual load impedance and the synthesized load impedance form load impedance 32. The preferred load impedance 32 is created or synthesized by impedance synthesizer 58 such that apparent load impedance 62 substantially matches characteristic impedance 64, which is equivalent to a source impedance.

Impedance synthesizer circuit 58 comprises a current source 60 and impedance synthesis circuitry 50. The current $I_L$ 61 produced by current source 60 is dependent on output voltage $V_o$ 63 output by impedance synthesis circuitry 50. Impedance synthesis circuitry 50 further includes a analog to digital converter (ADC) 54, a generator 52, and a digital to analog converter (DAC) 56. In order for circuit 58 to generate or synthesize an impedance that substantially matches characteristic impedance 64, current 61 generated by current source 60 must have a value equal to the voltage present on transmission line divided by characteristic impedance 64. Impedance synthesis circuitry 50 is an example of impedance synthesis means.

Characteristic impedance 64, or the source impedance is usually a known or prescribed value. Thus the value of the load impedance to be synthesized is also known in most instances. The process of synthesizing load impedance 32 begins by determining the line voltage $V_L$ 65, which is the voltage across terminals 41 and 42 in this example. ADC 54 receives the voltage present on each terminal 41 and 42 in order to determine and digitize line voltage 65. Generator 52 receives the digitized line voltage and produces a numeric output that is related to the prescribed load impedance. The output voltage of generator 52 is converted to its equivalent by voltage DAC 56 and connected to current source 60. Generator 52 produces an output voltage that causes current source 60 to generate a current having a value of line voltage 65 divided by load impedance 32. Circuit 58 synthesizes a load impedance having a value equal to line voltage 65 divided by current 61, which is substantially equal to characteristic impedance 64.

In a preferred embodiment, generator 52 is capable of generating or synthesizing more than one impedance. Generator 52 may be embodied as a digital processor, microcontroller, programmable logic gate array, logic circuitry, state machine, or in software. Impedance synthesis circuitry 50 may also be implemented as an ASIC, which frequently incorporates, along with generator 52, ADC and DAC interfaces as integrated subsystems. As a result, the only other component needed to synthesize an impedance across two terminals is an external voltage to current converter or current source. In another embodiment, the current source or voltage to current converter can also be internal to the ASIC as long as the maximum voltage across terminals 41 and 42 does not exceed the safe operating voltage of the ASIC. ASIC is another example of impedance synthesis means.

Figure 4:
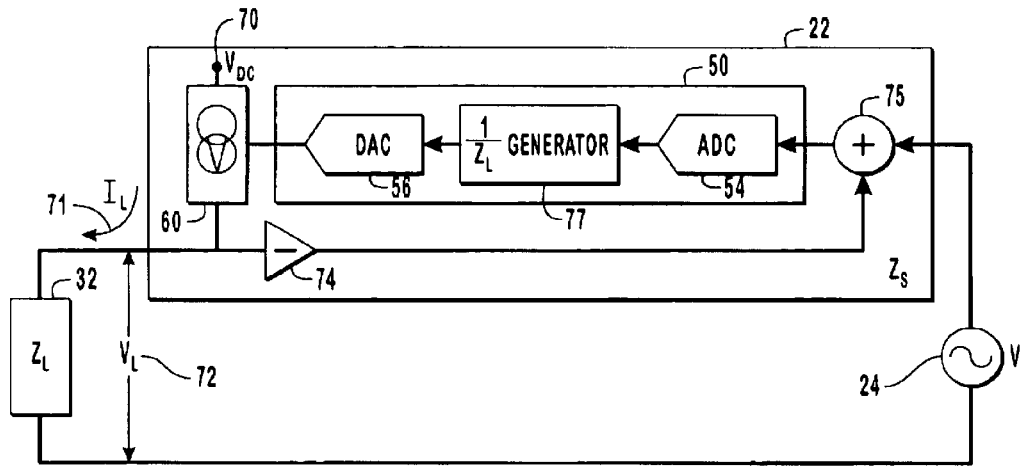
FIG. 4 is a schematic diagram illustrating the synthesis of a source impedance.

FIG. 4 is a schematic diagram of one embodiment of circuitry for synthesizing a source impedance, as opposed to a load impedance. Several similarities exist between the synthesis of both load impedances and source impedances. For instance, the generation or synthesis of a source impedance also utilizes DAC 56 and ADC 54. Generator 73 is similar to generator 52 in FIG. 3, with the essential difference being that the controlling factor is the value of the source impedance instead of the load impedance. DAC 56, ADC 54, and generator 77 may be contained in an ASIC, as described with respect to FIG. 3.

The synthesis of source impedance ($Z_s$) 22 is synthesized or created by determining the voltage across source impedance 22, which is: $V-V_L=V_s$. The current $I_s$ through source impedance 22 is equal to $V_s$ divided by $Z_s$. Voltage $V_L$ 72 is subtracted from voltage V 24 using inverter 74 and adder 75. As a result of this combination by adder 75, the voltage sampled and digitized by ADC 54 is the voltage across source impedance 22 or $V_s$. This voltage $V_s$ is scaled and processed by generator 77 to generate an output substantially equal to $V_s$ divided by $Z_s$. DAC 56 transforms this output voltage into its analog equivalent, which is fed to a voltage to current converter, or current source 60. It is assumed that $V_{dc}$ node 70 is maintained at an appropriately higher potential than voltage $V_L$ 72.

Current source 60 is capable of generating a current in either direction in order to accommodate negative impedance elements. The synthesis of negative impedance elements is effectively accomplished by changing the algebraic signs of the terms that are used in generator 77. Also, inductive elements can be gyrated to capacitive elements and vice versa.

Figure 5:
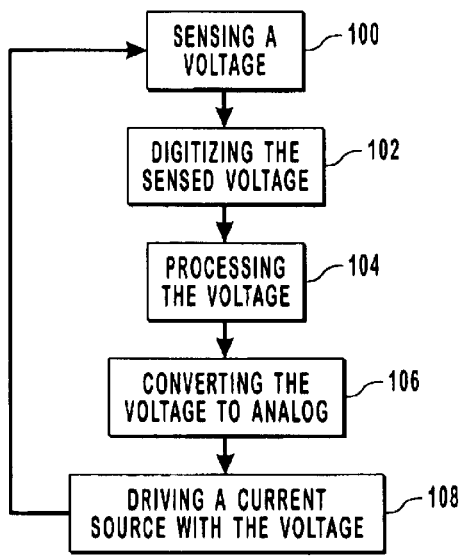
FIG. 5 is a flowchart of a method for synthesizing an impedance.

FIG. 5 illustrates an exemplary flowchart of the steps required to synthesize an impedance. In step 100, a voltage is sensed or measured. In many instances, the voltage being measured appears across the terminals of a transmission line, but the impedance may occur in other locations. In a preferred embodiment, the impedance to be synthesized will appear across the terminals whose voltage is being measured. The chronological gap between the sampling of the voltage and the application of the synthesized impedance should be minimized to obtain the most effective results. In step 102, the measured or sensed voltage is received at an ADC and digitized.

After the sensed or measured voltage has been digitized, a digital processor in step 104 processes the digitized signal. The function of the processor is to output a value or voltage that is related to the sensed voltage and the impedance that is being synthesized. This step is accomplished because the value of the impedance being synthesized is known and the relevant voltage has been measured. Typically, the output voltage of the digital processor has a value equal to the ratio of the sensed voltage divided by the desired impedance. One exemplary execution of this step scales and processes the digitized samples in conjunction with values that correspond to a prescribed load impedance thereby generating a output equal to the originally measured voltage divided by the prescribed impedance.

In step 106 the output generated by the digital processor is supplied to a DAC, where it is converted to its analog equivalent. The analog output voltage is operably connected to and drives a voltage to current converter in step 108 to generate a certain current. The value of the current is substantially equal to the sensed voltage divided by the desired impedance. Because the impedance is being synthesized across two terminals whose voltage is known and because the current being generated at the voltage to current converter is also known, the impedance between the terminals is, by Ohm's law, equal to the ratio of the sensed voltage divided the generated current, which is equal to the desired impedance. To maintain accuracy of synthesized impedance, the device continues to monitor the voltage level by returning to step 100 after step 108. This feedback loop allows the device to continuously measure and make various adjustments.

Accordingly, this impedance synthesis method is not limited to voltage adjustment and may be applied to the adjustment of many different circuit characteristics, such as voltage, current, or impedance depending on the application. Thereby enabling the attached load circuit to match the source with the least signal degradation. Facilitating this matching allows the source and load to interact in an optimal power transfer manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for synthesizing a prescribed impedance, the method comprising the steps of:
   determining a magnitude of a line voltage by subtracting a load voltage value from a source voltage value;
   digitizing the line voltage;
   deriving an output voltage based on the line voltage and the value of the prescribed impedance; and
   producing a current with the output voltage such that the current has a value substantially equal to the line voltage divided by the prescribed impedance.

2. A method as defined in claim 1, wherein the step of determining a line voltage further comprises the step of measuring the voltage that is present across a pair of terminals of a transmission line and wherein the prescribed impedance appears across the terminal pair.

3. A method as defined in claim 1, wherein the step of deriving the output voltage comprises the step of scaling the digitized line voltage by the prescribed impedance.

4. A computer readable medium having computer executable instructions for performing the steps recited in claim 1.

5. In a circuit connected between a first and a second terminal of a transmission line, a method for synthesizing a desired impedance between the terminals, the method comprising the steps of:
   identifying a value of a desired impedance;
   calculating a value of a line voltage that is present across the first and second terminals;
   calculating a value for an impedance synthesis factor that is substantially equal to a ratio of the line voltage to the desired impedance; and
   producing a current within the circuit via a current source device, wherein the current magnitude has a value that is controlled by the impedance synthesis factor.

6. A method as defined in claim 5, wherein the value of the current magnitude is substantially equal to the line voltage divided by the value of the desired impedance.

7. A method as defined in claim 5, wherein the current is produced so as to flow in a first predetermined direction within the circuit.

8. A method as defined in claim 5, wherein the current is produced so as to flow in a second predetermined direction within the circuit.

9. A method as defined in claim 5, further comprising the step of continuously monitoring the value of the line voltage and adjusting the value of the current magnitude so as to substantially maintain the value of the desired impedance.

10. A method for synthesizing a desired impedance between a first and a second terminal, the method comprising the following steps:
    detecting a magnitude of a voltage between the first and the second terminals;
    digitizing the detected voltage;
    processing the digitized voltage in a manner so as to derive an output voltage value that is substantially equal to the digitized voltage divided by a value that is representative of a desired impedance;
    converting the output voltage to its substantial analog equivalent; and
    utilizing the analog output voltage to generate a current that flows between the first and second terminal, wherein the current has a magnitude that is substantially equal to the detected voltage divided by the desired impedance.

* * * * *